Oct. 29, 1935.  W. H. KNISKERN  2,018,857
PROCESS AND APPARATUS FOR DISPENSING MEASURED QUANTITIES OF LIQUEFIED GAS
Filed Sept. 20, 1933  3 Sheets-Sheet 1

INVENTOR
Walter H. Kniskern
BY
ATTORNEY

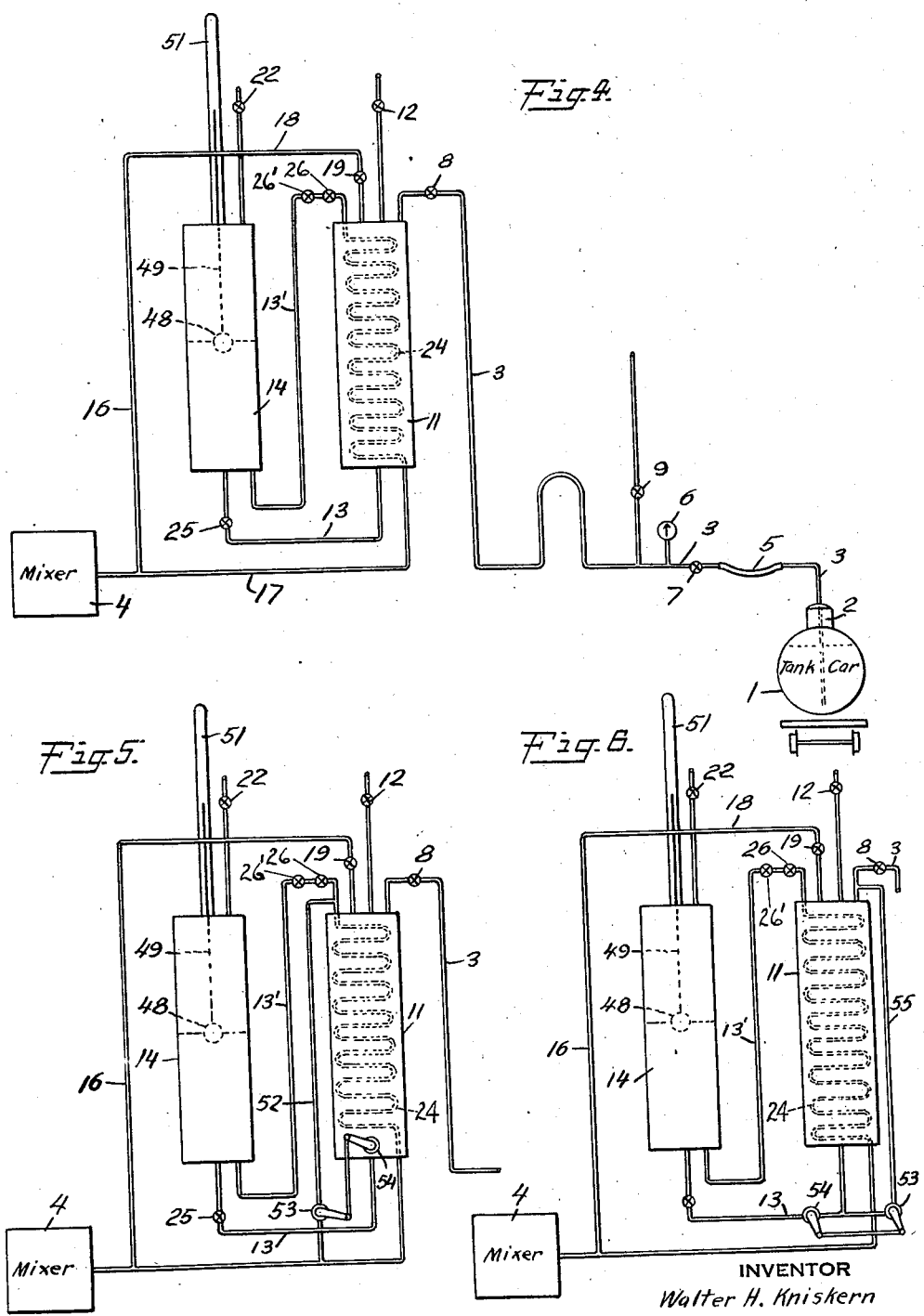

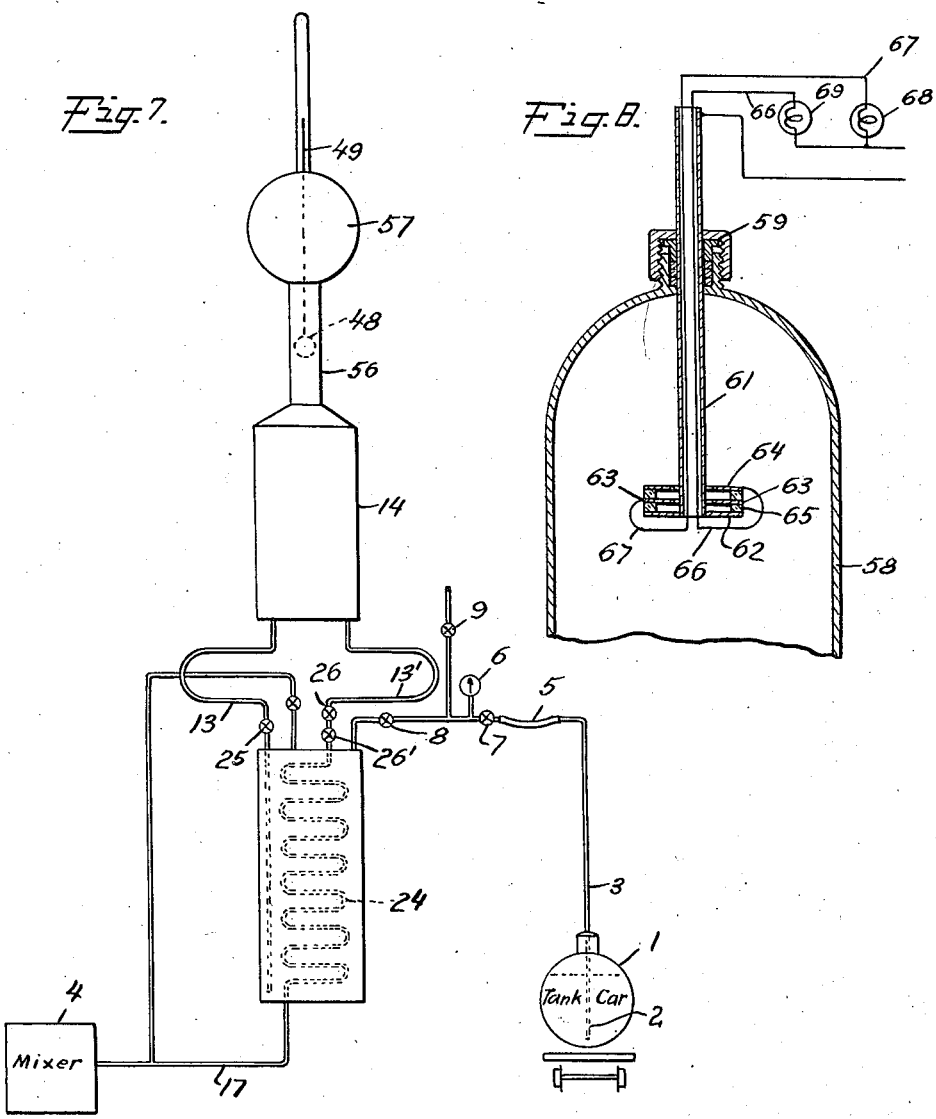

Patented Oct. 29, 1935

2,018,857

UNITED STATES PATENT OFFICE 2,018,857

PROCESS AND APPARATUS FOR DISPENSING MEASURED QUANTITIES OF LIQUEFIED GAS

Walter H. Kniskern, Petersburg, Va., assignor to Atmospheric Nitrogen Corporation, New York, N. Y., a corporation of New York Application September 20, 1933, Serial No. 690,175

20 Claims. (Cl. 62—1)

This invention relates to the dispensing of measured amounts of a liquefied gas maintained under super-atmospheric pressure, and more particularly, to the dispensing of measured amounts of liquid anhydrous ammonia from a tank car in which the gas is maintained at super-atmospheric pressure, into a mixer, such as a fertilizer mixer.

Liquid anhydrous ammonia is commonly stored and transported in commerce so that it reaches the consumer at a pressure of between 50 and 150 pounds per square inch gauge, the corresponding temperature being about 34° F. and 84° F., respectively. The temperature of the room in which the measuring apparatus is placed and the temperature of the measuring apparatus frequently rises to 100° F. or more, particularly during the summer months in the southern portion of the United States. The pressure exerted by anhydrous ammonia at 100° F. is about 197 pounds per square inch gauge. The problem, then, is to cause ammonia to flow from a tank car in which the pressure is between 50 and 150 pounds per square inch gauge, into a measuring apparatus having a temperature such that a pressure of about 197 pounds per square inch gauge will be developed by the ammonia when it comes in contact with the walls of the measuring apparatus.

The usual practice in dispensing liquid ammonia from a tank car has included a measuring tank, and an ammonia compressor which has been employed to withdraw gas from the top of the measuring tank and discharge it into the top of the tank car, thus creating a pressure differential between the tank car or other storage tank and the measuring tank sufficient to cause the liquid ammonia to flow from the tank car into the measuring tank. In certain instances a compressor has been employed to force air or inert gas into the tank car, thus creating a pressure in the tank car higher than the pressure corresponding to the temperature in the measuring tank. These procedures are objectionable because of the relatively expensive equipment for their practice and the expense involved in the maintenance and operation of such equipment.

It is evident that a discharge of liquid ammonia from a tank car into a measuring tank could be effected by venting the measuring tank to the atmosphere, which would reduce the pressure in the measuring tank beneath the pressure in the tank car. The conditions here, however, are quite different from those obtaining with a relatively non-volatile fluid, such as water. Consider a tank car containing water at an air pressure of 50 to 150 pounds per square inch gauge in the interior of the tank car above the surface of the liquid. If it were desired to fill a closed measuring tank with water from this tank car, it would be necessary only to vent to the atmosphere that quantity of air which fills the measuring tank at atmospheric pressure.

Now, consider a tank car containing ammonia at a pressure of 50 pounds per square inch gauge and a corresponding temperature of 34° F. and assume that the pressure in the measuring tank must be 25 pounds per square inch gauge less than the pressure in the tank car in order to cause ammonia to flow through the connecting piping at rates desirable in commercial operation. In order to have the pressure in the measuring tank 25 pounds per square inch gauge, its temperature must be about 11° F. so that the ammonia in the measuring tank must be cooled about 23° F. by the evaporation of a portion of it, which requires the evaporation and venting of about 4.4 per cent of the ammonia flowing from the tank car into the measuring tank. With a tank car containing ammonia at 150 pounds per square inch gauge, about 2.2 per cent of the ammonia flowing into the measuring tank must be evaporated and vented in order to reduce the pressure in the measuring tank to 125 pounds per square inch gauge. It will be seen that venting to the atmosphere is not commercially feasible because of the loss of ammonia incident thereto. The provision of equipment for recovering the ammonia thus vented involves the objectionable expense of constructing, maintaining, and operating the recovery equipment.

Furthermore, the ammonia cannot be vented to the mixer without interfering with operation, since the operation of a fertilizer mixer is usually, if not always, a batch operation, and it is necessary to synchronize the introduction of ammonia with a certain step of the mixing procedure. For example, in the ammoniation of superphosphate or superphosphate mixtures, it is the practice to spray the ammonia over the superphosphate material immediately after it has entered the mixer. Accordingly, if is is attempted to vent the measuring tank to the mixer, the measuring tank can be filled only after the introduction of superphosphate into the mixer, at which time the mixer is ready to receive the full charge of ammonia. This causes a delay in operation.

It is an object of this invention to provide a process and apparatus for dispensing measured quantities of a liquefied gas, such as ammonia, from a tank car or other main bulk thereof, under super-atmospheric pressure, into a mixer, such as a fertilizer mixer, the dispensing of the ammonia in normal operation being independent of the mixer and being accomplished without the use of pumps or compressors. Other objects and advantages of this invention will be apparent from the following detailed description.

In accordance with this invention, the ammonia fed to the measuring tank is pre-cooled to lower its vapor pressure by the expansion of a precedent charge of ammonia after the volume or weight of the precedent charge has been determined and during the passage of the precedent or measured charge of ammonia into the mixer. In accordance with a preferred embodiment of this invention, a portion of the liquid ammonia is intermittently withdrawn from the main bulk, as for example, from a tank car or other storage tank, to form a supply thereof. A measured amount of ammonia is removed from this supply with simultaneous replenishment of the supply from the main bulk and the measured ammonia is passed into the mixer while some or all of the measured ammonia is expanded in heat exchange relation with the supply, thus reducing the vapor pressure of the supply beneath the vapor pressure of the main bulk of liquid ammonia, i. e., the ammonia in the tank car. The pressure differential thus created is utilized to cause the flow of a further amount of ammonia from the main bulk to the supply.

In the preferred embodiments illustrated on the drawings, the invention is shown incorporated in liquid ammonia dispensing equipment and the present description will be confined to the illustrated embodiments of the invention. It will be understood, however, that the novel features and improvements are susceptible to other applications, for example, to the dispensing of measured amounts of other liquids having high vapor pressure, for example, to the dispensing of measured amounts of concentrated aqua ammonia. Hence, the scope of this invention is not confined to the embodiments herein described.

In the drawings—

Fig. 4 shows a side elevation of another modified arrangement of apparatus for practicing this invention;

Fig. 5 shows a side elevation of an arrangement of apparatus similar to that of Fig. 4 but equipped with an automatic temperature control to effect the introduction of the ammonia into the measuring tank at a constant temperature, and therefore, constant density;

Fig. 6 shows a side elevation of apparatus similar to that of Fig. 5, the by-pass about the cooler being on the incoming liquid ammonia side of the cooler, and not as in Fig. 5, around the coil in the cooler;

Fig. 7 is a side elevation of apparatus for practicing this invention illustrating a modification in which the measuring boot is supported above the cooler; and Fig. 8 is a fragmentary vertical section, partly in elevation, through a measuring tank, equipped with electrically operated means for indicating when the level of liquid therein has risen to a predetermined point.

Figure 1:
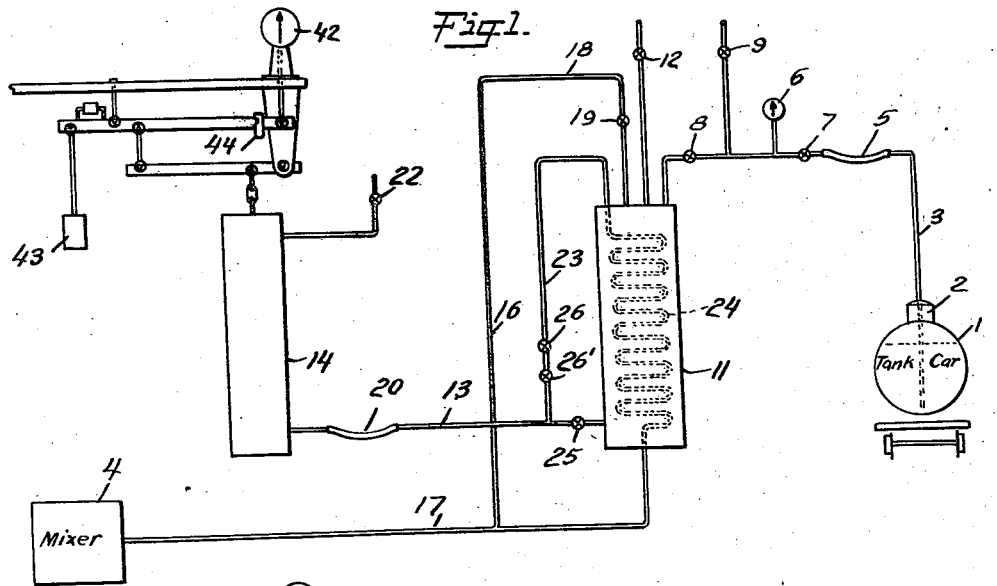
Fig. 1 is a side elevation of apparatus embodying a preferred embodiment of this invention.

In the drawings, in which like parts in all the figures have been given like reference numerals, reference character 1 (Fig. 1) designates a tank car of usual construction for transporting anhydrous ammonia. This tank car is provided with a dip pipe 2. A pipe 3 leads from the dip pipe 2 to the apparatus hereinafter described for delivering measured amounts of ammonia to a mixer 4. One end of pipe 3 may be connected with the dip pipe 2 by flexible connection 5 and this pipe may be provided with a pressure gauge 6, valves 7 and 8, and a relief valve 9. The other end of pipe 3 enters into the top of a cooler 11, which is equipped with a relief valve 12. The bottom of this cooler is communicably connected, by means of a valve-controlled pipe 13, with the bottom of a weigh tank 14 suspended from a scale of any well-known type, such, for example, as that shown on the drawing. A pipe 18, flow through which is controlled by a valve 19, connects the top of the cooler 11 with a pipe 17, leading into the mixer 4. A flexible connection 20 is employed to connect the pipe 13 with the weigh tank 14, permitting limited vertical movement of this tank. Weigh tank 14 may be equipped with a relief valve 22.

A pipe 23 leads from pipe 13 and communicates with the inlet of a coil 24 disposed within cooler 11. The outlet of coil 24 is communicably connected with pipe 17. In the pipe 13, between the connections of this pipe to pipe 23 and the connection thereof to cooler 11, there is disposed a valve 25 for controlling flow from the cooler 11 to the weigh tank 14. An expansion valve 26 is inserted in the pipe or line 23 as shown in Fig. 1, which valve, in operation, is set to allow the ammonia to pass therethrough at a predetermined rate, a second valve 26' being provided which is tightly closed when filling the weigh tank 14 and wide open when discharging the contents of the tank into the mixer 4. Thus, the necessity for opening valve 26, if it alone were used, to a definite partially open position during each discharge period is obviated. Instead of valve 26, an expansion orifice of predetermined size could be employed.

In starting up the apparatus of Fig. 1, valves 7 and 8 are opened, allowing liquid ammonia to flow under its vapor pressure from tank car 1 into cooler 11. If the cooler does not fill due to the vapor pressure within the tank car 1, valve 19 is opened, venting the gaseous ammonia in cooler 11 through pipes 18, 16, and 17 into the mixer 4, which should contain material capable of absorbing ammonia. The cooler 11 will thus be partially or completely filled with liquid ammonia, as desired, and valve 8 is then closed. If valve 19 has not been opened to permit the filling of cooler 11, it is opened upon the completion of the filling of the cooler 11, permitting the ammonia in the cooler 11 to boil, thus chilling the portion of the ammonia remaining in the cooler 11, the ammonia gas passing into the mixer 4 through pipes 18, 16, and 17.

When the contents of the cooler 11 are sufficiently chilled, say 10 to 40° F. below the temperature of the liquid ammonia in the tank car, valve 19 is closed, valves 8 and 25 opened, whereupon the cold ammonia within the cooler 11 will pass into the weigh tank 14, a similar volume of relatively warm ammonia flowing from the tank car 1 and lying on top of the cold ammonia in the cooler 11. When the scale shows that the desired quantity of ammonia has entered the weigh tank 14, valve 25 is closed. Valve 26' is then opened wide, whereupon the ammonia passes from the weigh tank 14 through pipes 13, 23, coil 24, pipe 17 to mixer 4, being impelled by the vapor pressure above the liquid surface in the weigh tank 14. Expansion of the ammonia occurs beyond the valve 26 in the coil 24 and the liquid ammonia in the cooler 11 is cooled by the evaporation of some of the ammonia passing within the coil 24, the ammonia leaving the coil entering into the mixer 4.

In normal operation, i. e., once the supply of ammonia in the cooler has been cooled to a temperature, say 10° to 40° F., below the temperature of the ammonia in the tank car, it is not necessary to vent through valve 19. It is only necessary to open valve 25 until the desired quantity of precooled liquid ammonia, as indicated by the scale, is admitted to the weigh tank 14, after which valve 25 is closed. Valve 26' is then opened wide, permitting passage of the liquid ammonia into the mixer through pipes 13, 23, coil 24, and pipe 17, expansion of ammonia occurring beyond valve 26, chilling the liquid ammonia in tank 11. It will be noted that the refrigerating effect obtained by expanding a portion of each weighed charge of ammonia on its way to the mixer 4 from weigh tank 14 is used to precool the charge which is to be admitted into the weigh tank 14, thus lowering the vapor pressure of the ammonia fed to the weigh tank. Hence, after the discharge of the contents of the weigh tank 14 into the mixer, the closing of valve 26', and the opening of valve 25, cold ammonia within the cooler 11 will pass into the weigh tank 14, a similar volume of relatively warm ammonia flowing from the tank car 1 or main bulk thereof and lying on top of the supply of cold ammonia in tank 11, which, when operated as hereinabove described, is maintained full of liquid ammonia.

Figure 2:
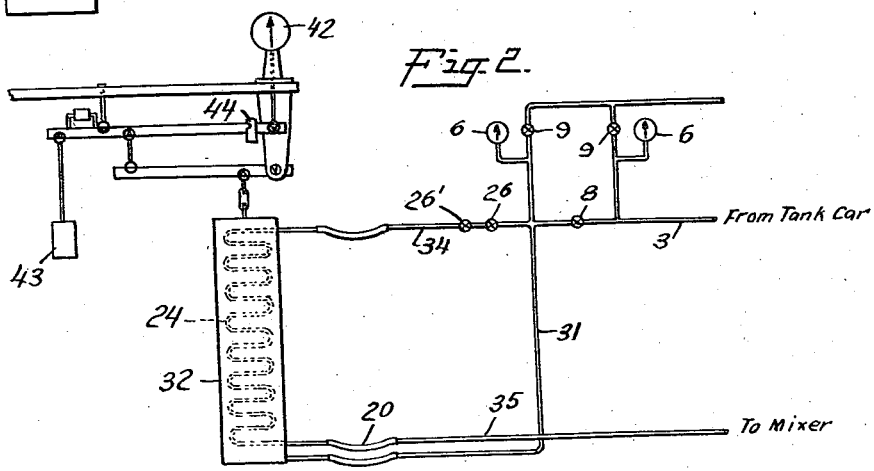
Fig. 2 is a fragmentary side elevation of a modified arrangement of apparatus for practicing this invention, the tank car being omitted for the sake of clarity.

The arrangement of apparatus of Fig. 2 differs from that of Fig. 1 chiefly in that the weigh tank and the cooler are combined in one unit. In the apparatus of Fig. 2, pipe 3, leading from the tank car, leads into pipe 31 communicating with the bottom of the combined cooler and weigh tank 32. Cooling coil 24, disposed within the tank 32, has its inlet communicating with pipe 31 by means of pipe 34 and its outlet communicably connected with the mixer by pipe 35.

In operation of the apparatus of Fig. 2, the tank 32 is not completely emptied during the discharge into the mixer, but a reservoir or supply of liquid ammonia is maintained in the tank. The cold ammonia remaining in this tank serves to chill the oncoming ammonia from the tank car enough so that the requisite amount of ammonia may be introduced into the tank 32. The ammonia enters the tank through pipe 3, valve 8 being open and valve 26' closed, liquid ammonia passing through pipe 31 into the tank 32. Upon the introduction of the desired charge into tank 32, valve 8 is closed, valve 26' opened, the ammonia flowing through pipe 31, valve 26, pipe 34, coil 24, pipe 35 to the mixer, the expansion of the ammonia occurring beyond valve 26 serving to chill the supply of ammonia remaining in tank 32 so that the vapor pressure in this tank is below the vapor pressure in the tank car 1.

Figure 3:
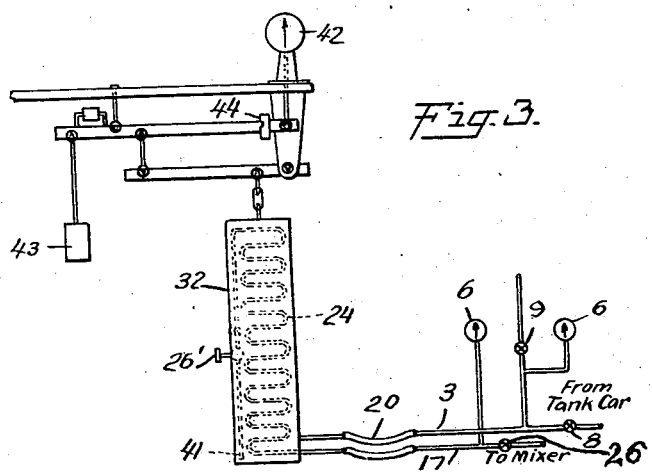
Fig. 3 is a side elevation corresponding to Fig. 2 of still a further modified form of apparatus for practicing this invention.

In the embodiment of the invention shown on Fig. 3, a combined cooler and weigh bottle 32 is suspended from the weighing scale as shown on the drawings. Inlet 41 of the cooling coil 24 is disposed within the tank 32. Expansion valve 26' is provided in the line from the inlet 41 to the coil 24 and stop valve 26 is placed in line 17 leading to the mixer. The operation of the apparatus of this figure is similar to that of Fig. 2 hereinabove described, liquid ammonia entering the weigh tank from the tank car through pipe 3, and when the desired charge has been introduced into tank 32, valve 8 is closed. The flow of ammonia from tank 32 through the coil 24 and pipe 17 to the mixer is controlled by valve 26. The expansion of the ammonia occurring beyond valve 26' cools the remainder of the supply of ammonia in tank 32 to reduce the vapor pressure therein beneath the vapor pressure in the tank car 1 permitting the introducing of a further charge from the tank car upon the closing of valve 26 and the opening of valve 8 in a subsequent stage of operation.

A preferred form of scale for weighing the charge in the weigh tank 14 or 32 is shown on Figs. 1 to 3 of the drawings. This scale involves a dial 42, a counterweight 43 for counter-balancing the weight of the empty bottle or tank 32 or 14, as the case may be, and a sliding weight 44. Such weighing mechanism is particularly adapted for weighing the charge of ammonia in the case of the apparatus of Figs. 2 and 3, in which a supply of ammonia is always maintained in tank 32. Referring to Figs. 2 and 3, it will be noted that if the counterweight 43 is adjusted to balance the empty bottle with the slide weight 44 placed at the zero mark, then the amount of ammonia introduced into the bottle or weigh tank 32 will be shown on the dial 42. If the sliding weight is pushed over to the 50-pound mark, then 50 pounds must be added to the weigh bottle or tank 32 in addition to that shown by the dial so that when the dial is brought back to zero by discharging ammonia from the bottle, there remains 50 pounds of cold ammonia in the bottle or weigh tank 32 which will be chilled upon the expansion of the ammonia in coil 24, and thus provide a pressure differential between the pressure in the weigh tank 32 and that in the tank car 1 to permit the introduction of a further charge into the weigh tank 32. The amount of chilling may be regulated by varying the amount of ammonia retained in the tank 32 after the desired measured amount has been sent to the mixer 4.

The arrangement of the apparatus of Fig. 4 differs from that of Fig. 1 chiefly in that instead of employing a weigh tank, a measuring boot is utilized provided with a float for indicating the volume of ammonia within the measuring boot 14. In this embodiment of the invention, a float 48 is disposed within the measuring boot 14 and is provided with an indicating stem 49 extending into the glass tube 51 provided with a scale for showing the level and hence the volume of ammonia within the measuring boot.

The embodiment of the invention shown in Fig. 5 differs from that of Fig. 4 chiefly in that the apparatus of Fig. 5 involves an automatic temperature control to effect the introduction of the ammonia into the measuring tank at substantially constant temperature, and hence, at substantially constant density. Fig. 5 shows a by-pass 52 around the coil 24 and the cooler 11. Flow through the by-pass 52 is controlled by a valve 53 operated by a temperature sensitive element 54 of any well-known type, the element being located in the base of cooler 11 or in the line 13 leading from the base of the cooler into the measuring tank 14. In operation, during the discharge of liquid ammonia from the measuring tank 14 into the mixer 4, the temperature-responsive element 54 functions to control the amount of ammonia passing through the by-pass 52 and to cause the passage of such amount of ammonia into the cooling coil 24 that the temperature of the ammonia in the tank 11 is cooled to the desired predetermined temperature, at which it is introduced into the measuring tank. Accordingly, the charges of ammonia intermittently fed to the measuring tank are all at substantially the same predetermined temperature, and therefore, density. Consequently, the volume readings from the level indicator can readily be transposed into weight readings.

In the apparatus of Fig. 6, a by-pass 55 is provided which leads from the ammonia liquid inlet pipe 3 of the cooler 11 about the cooler to the exit pipe 13. A temperature-responsive element 54 in the pipe 13 controls the valve 53 disposed in the by-pass 55. In operation, during the flow of hot ammonia from the tank car into the cooler and the flow of cooled ammonia from the cooler to the measuring tank, the temperature-responsive element functions to cause the feed of ammonia at a substantially constant predetermined temperature into the measuring tank. This is accomplished by causing ammonia to pass through the by-pass 55 by regulating the extent of opening of the valve 53, responsive to changes in temperature of the ammonia in the line leading into the measuring tank.

In the embodiment of the invention shown in Fig. 7, the measuring boot 14 is disposed directly above the cooler 11 in order to secure a compact arrangement of the apparatus and to insure thorough draining of the measuring boot. As in the case of Fig. 4, a line 13' connects the bottom of the measuring boot with the inlet to the coil 24. In the apparatus of Fig. 7, the measuring boot is provided with a restricted intermediate portion 56 connecting the top portion 57 with the base portion of the measuring boot 14. The measurement of the ammonia liquid within the measuring boot takes place within the restricted portion 56 by means of float 48 provided with an indicator 49, as described in connection with Fig. 5. By performing the measurement in the narrow neck 56, accuracy is promoted. The upper portion 57 of the measuring boot constitutes a gas chamber of sufficient size to insure that the desired charge may be introduced into the measuring boot during the starting up of the apparatus without necessitating the venting of the measuring boot to the mixer.

In Fig. 8, electrically operated mechanism for indicating when the level of liquid ammonia in the measuring boot reaches a predetermined point is shown. In this figure, reference numeral 58 indicates the top of the measuring vessel. Extending through a stuffing box 59 in the vessel 58 is a tube 61. Plate 62 is secured to the bottom of the tube 61. Above plate 62 are plates 63 and 64 the tube 61. Above plate 62 are plates 63 and 64 supported by insulators 65 and suitable through bolts (not shown). A wire 66 is attached to plate 64 and a second wire 67 is attached to plate 63. These wires are insulated, pass up through the hollow tube 61, and through suitable packing or other seal preventing the escape of gas from the tank 58. Tube 61 and the connected parts may be moved up and down through the stuffing box 59 in order to adjust the indicator to any desired level to which the measuring vessel may be filled.

Wire 67 is in communication with an indicator 68 and wire 66 is in communication with a second indicator 69. The two indicators 68 and 69 are in circuit with a suitable source of electrical energy so that when the liquid ammonia covers plates 62 and 63, the circuit through indicator 68 is closed and when it covers plates 63 and 64, the circuit through indicator 69 is closed. The indicators may be electric lamps, buzzers, bells, etc. In practice, it has been found that the ammonia is sufficiently conducting to light a lamp with 110 volts A. C. as the source of E. M. F. It will be appreciated that an operator upon observing indicator 68 showing that the level of liquid has risen to plate 63 will be notified that the level is reaching the desired predetermined point represented by the topmost plate 64, and when the second indicator 69 is energized, will immediately close the valve controlling flow of liquid ammonia into the measuring tank.

Thermal insulation may be provided about the cooler, weigh tank, and pipes connecting the various parts of the apparatus (but not including coil 24 within the cooler).

It will be noted that in accordance with this invention, the discharge of measured quantities of liquid ammonia or other liquefied gas under super-atmospheric pressure is accomplished without the use of compressors or pumps. After operation of the apparatus is commenced, i. e., during normal operation, the operation of the apparatus is entirely independent of the fertilizer mixer and this without loss of ammonia or the employment of storage equipment for collecting ammonia vented to permit flow of ammonia from the tank car to a measuring device.

Since certain changes in carrying out the above process and in the constructions set forth, which embody the invention, may be made without departing from its scope, it is intended that all matter contained in the above description or shown in the accompanying drawings shall be interpreted as illustrative and not in a limiting sense.

I claim:

1. The process of dispensing measured quantities of a liquefied gas from a main bulk thereof, which comprises intermittently lowering the temperature of a portion of the liquefied gas, thus reducing its vapor pressure beneath that of the main bulk, and utilizing the pressure differential thus created to effect the withdrawal of a further portion of the liquefied gas from said main bulk.

2. The process of dispensing measured quantities of liquid ammonia from a main bulk thereof, which comprises intermittently withdrawing portions of ammonia from the said main bulk, cooling the portions thus withdrawn to reduce their vapor pressure beneath that of the main bulk, and utilizing the pressure differential thus created to effect the withdrawal of the further portions of liquid ammonia from said main bulk.

3. The process of dispensing measured quantities of a liquefied gas from a main bulk thereof, which comprises intermittently feeding successive charges of liquefied gas from the main bulk thereof to a measuring device, and intermittently vaporizing the measured charges of liquefied gas removed from the measuring device in heat-exchange relation with succeeding charges of liquefied gas fed to the measuring device.

4. The process of dispensing measured quantities of a liquefied gas from a main bulk of said liquefied gas under superatmospheric pressure, which comprises withdrawing a portion of the liquefied gas, cooling the withdrawn portion so that the vapor pressure thereof is less than that of the main bulk, introducing the cooled liquefied gas into a measuring device, and utilizing the pressure differential thus created to effect the withdrawal of a further portion of the liquefied gas from the main bulk.

5. The process of dispensing measured quantities of liquid ammonia from a main bulk of liquid ammonia under super-atmospheric pressure, which comprises withdrawing a portion of the liquid ammonia, cooling the withdrawn portion, introducing the cooled liquid ammonia into a measuring tank, and utilizing the pressure differential thus created to effect the withdrawal of a further amount of liquid ammonia from the main bulk, and the feed thereof into the measuring tank.

6. The process of dispensing measured quantities of a liquefied gas from a main bulk of said liquefied gas under super-atmospheric pressure, which comprises withdrawing some of said liquefied gas and utilizing the refrigerating effect produced by vaporizing some or all of a measured portion of the liquefied gas thus withdrawn to permit the withdrawal of a further amount of liquefied gas from said main bulk of said liquefied gas.

7. The process of dispensing measured quantities of a liquefied gas from a main bulk of said liquefied gas under super-atmospheric pressure, which comprises withdrawing some of said liquefied gas, utilizing the refrigerating effect produced by vaporizing some or all of a measured portion of the liquefied gas thus withdrawn in heat exchange relation with the remainder of the liquefied gas thus withdrawn to create a pressure differential between the pressure to which the said remainder of the liquefied gas is subjected and the pressure at which said main bulk of the liquefied gas is maintained, and utilizing said pressure differential to cause the flow of a further amount of liquefied gas from said main bulk of liquefied gas to said remainder of liquefied gas.

8. The process of dispensing measured amounts of a liquefied gas from a main bulk of said liquefied gas under super-atmospheric pressure, which comprises withdrawing a portion of said liquefied gas to form a supply thereof, removing a measured amount of liquefied gas from said supply, and vaporizing at least a portion of said measured amount in heat exchange relation with the remainder of said supply to lower the vapor pressure of said supply below the vapor pressure of said main bulk of liquefied gas.

9. The process of dispensing into a mixer measured quantities of liquid ammonia from a main bulk of said liquid ammonia under super-atmospheric pressure, which comprises withdrawing a portion of said liquid ammonia from said main bulk to form a supply thereof, removing a measured amount of ammonia from said supply, and passing said measured amount of ammonia into a mixer while vaporizing at least a portion thereof in heat exchange relation with the remainder of said supply.

10. The process of dispensing into a mixer measured quantities of liquid ammonia from a main bulk of liquid ammonia under super-atmospheric pressure, which comprises withdrawing a portion of said liquid ammonia from said main bulk to form a supply thereof, removing a measured amount of ammonia from said supply, passing said measured amount of ammonia into a mixer while vaporizing at least a portion thereof in heat exchange relation with the remainder of said supply to create a pressure differential between the pressure to which the said remainder of liquid ammonia is subjected and the pressure at which the main bulk of liquid ammonia is maintained, and utilizing said pressure differential to cause the flow of a further amount of ammonia from said main bulk to said remainder of liquid ammonia.

11. The process of intermittently dispensing measured quantities of a liquefied gas from a main bulk of said liquefied gas, which comprises intermittently withdrawing a portion of said liquefied gas to form a supply thereof, removing a measured amount of liquefied gas from said supply, and vaporizing at least a portion of said measured amount while removing it from said supply, said vaporization of the liquefied gas occurring in heat exchange relation with the remainder of the liquefied gas, constituting the said supply thereof.

12. The process of intermittently dispensing into a mixer a measured quantity of liquid ammonia from a main bulk of liquid ammonia, which comprises intermittently withdrawing a portion of liquid ammonia from said main bulk to form a supply thereof, intermittently removing a measured amount of said liquid ammonia from said supply, intermittently vaporizing at least a portion of said measured amount of ammonia while removing it from said supply, and feeding it to the mixer, said vaporization occurring in heat exchange relation with the remainder of the liquid ammonia constituting said supply so that the pressure to which said remainder of liquid ammonia is subjected is reduced below the pressure at which the main bulk of liquid ammonia is maintained, and utilizing this pressure differential to cause a flow of a further amount of liquid ammonia from said main bulk to said remainder of liquid ammonia.

13. Apparatus for dispensing measured quantities of a liquefied gas from a main bulk of said liquefied gas under super-atmospheric pressure, which comprises means for withdrawing some of the liquefied gas from said main bulk, and means for utilizing the refrigerating effect produced by vaporizing a measured portion of the liquefied gas thus withdrawn to cause the withdrawal of a further amount of liquefied gas from said main bulk of liquefied gas.

14. Apparatus for dispensing measured quantities of liquefied gas from a main bulk thereof under super-atmospheric pressure, which comprises means for withdrawing a portion of the liquefied gas to form a supply thereof, means for removing a measured amount of liquefied gas from said supply, and means for vaporizing at least a portion of the measured amount thus removed in heat exchange relation with said supply to lower the vapor pressure of said supply below that of said main bulk.

15. Apparatus for dispensing into a mixer measured quantities of liquid ammonia from a tank in which the liquid ammonia is maintained at superatmospheric pressure, which comprises a cooler communicating with said tank, a coil in said cooler, a weighing scale, a weigh tank supported by said weighing scale and having its inlet communicably connected with said cooler and its outlet communicably connected with the inlet of said coil, the outlet of said coil being communicably connected to said mixer, and an expansion valve in the connection between said weigh tank and said coil.

16. Apparatus for dispensing into a mixer measured quantities of liquid ammonia from a tank in which the ammonia is maintained at super-atmospheric pressure, which comprises a cooler communicably connected with said tank, a coil in said cooler, a measuring boot having its inlet communicating with said cooler and its outlet communicably connected with the inlet of said coil, the outlet of said coil being communicably connected with the mixer, an expansion valve in the connection between the measuring boot and said coil, a float in said measuring boot, and means connected to said float for indicating the volume of liquid ammonia within said measuring boot.

17. Apparatus for dispensing into a mixer measured quantities of liquid ammonia from a tank in which the ammonia is maintained under super-atmospheric pressure, which comprises a measuring boot, means for feeding liquid ammonia from said measuring boot to said mixer, and means within said measuring boot through which ammonia is adapted to be passed into the mixer, the ammonia thus passed being expanded in heat exchange relation with the ammonia in the measuring boot.

18. Apparatus for dispensing into a mixer measured amounts of liquid ammonia from a tank in which the ammonia is maintained under super-atmospheric pressure, which comprises a weigh tank, means for feeding liquid ammonia from said weigh tank to said mixer, a weighing scale by which said weigh tank is supported, a coil within said weigh tank having its inlet communicating with the weigh tank and its outlet with the mixer, and an expansion valve for controlling the flow of liquid ammonia from the weigh tank to said coil.

19. Apparatus for dispensing into a mixer measured quantities of liquid ammonia from a tank in which the ammonia is maintained under super-atmospheric pressure, which comprises a cooler connecting with said tank, a measuring boot disposed above said cooler and communicably connected therewith, said measuring boot having a restricted intermediate portion communicably connecting an enlarged portion at the top of the measuring boot with the base portion of the boot, a coil passing through the cooler and connecting the base of the measuring boot with the mixer, a float in the restricted portion of the measuring boot, and means connected to said float for indicating the volume of liquid ammonia in the measuring boot.

20. Apparatus for dispensing into a mixer measured quantities of liquid ammonia from a tank in which the ammonia is maintained under super-atmospheric pressure, which comprises a cooler connected to said tank, said cooler having a coil therein, a measuring boot having its inlet communicably connected with the inlet of said coil, the outlet of said coil connecting with said mixer, and electrically operated means within said measuring boot for indicating when the volume of liquid ammonia therein rises to a predetermined point.

WALTER H. KNISKERN.